(12) United States Patent
Wach et al.

(10) Patent No.: US 12,196,313 B2
(45) Date of Patent: Jan. 14, 2025

(54) TENSIONING DEVICE WITH A SINGLE SECURING RING

(71) Applicant: IWIS MOTORSYSTEME GMBH & CO. KG, Munich (DE)

(72) Inventors: Franz Wach, Icking (DE); Florian Bruhn, Türkheim (DE); Andreas Görmer, Iffeldorf (DE); Thomas Baumgartner, Munich (DE); Petra Doll, Antdorf (DE)

(73) Assignee: IWIS MOTORSYSTEME GMBH & CO. KG, Munich (DE)

( * ) Notice: Subject to any disclaimer, the term of this patent is extended or adjusted under 35 U.S.C. 154(b) by 233 days.

(21) Appl. No.: 17/638,138

(22) PCT Filed: Sep. 4, 2020

(86) PCT No.: PCT/EP2020/074859
§ 371 (c)(1),
(2) Date: Feb. 24, 2022

(87) PCT Pub. No.: WO2021/044028
PCT Pub. Date: Mar. 11, 2021

(65) Prior Publication Data
US 2022/0299091 A1 Sep. 22, 2022

(30) Foreign Application Priority Data

Sep. 5, 2019 (DE) .................. 10 2019 123 816.1
Sep. 5, 2019 (DE) .................. 10 2019 123 818.8

(51) Int. Cl.
*F16H 7/08* (2006.01)
*F16H 7/18* (2006.01)

(52) U.S. Cl.
CPC ....... *F16H 7/18* (2013.01); *F16H 2007/0806* (2013.01); *F16H 2007/0812* (2013.01);
(Continued)

(58) Field of Classification Search
CPC .............. F16H 7/08; F16H 2007/0808; F16H 2007/0812; F16H 2007/0853;
(Continued)

(56) References Cited

U.S. PATENT DOCUMENTS 5,704,860 A * 1/1998 Stief .................. F16H 7/0848
474/138
6,935,978 B2 * 8/2005 Hayakawa ........... F16H 7/0836
474/110
(Continued)

FOREIGN PATENT DOCUMENTS

DE  36 36 918 A1  5/1988
DE  100 14 700 A1  10/2001
(Continued)

OTHER PUBLICATIONS

DE 202017100695 U1 Iwis Motorsystem Gmbh (Year: 2017).*
FR 3053427 A1 Fischer (Year: 2017).*
DE 202017100695 U1 Machine Translation. (Year: 2018).*

*Primary Examiner* — Michael R Mansen
*Assistant Examiner* — Juan J Campos, Jr.
(74) *Attorney, Agent, or Firm* — BakerHostetler

(57) ABSTRACT

A tensioning device, more particularly a hydraulically actuated chain tensioner, for a chain drive of an internal combustion engine, having a tensioner housing, a tensioning piston which is displaceably guided in a piston bore of the tensioner housing and has a piston skirt, a transport securing means for fastening the tensioning piston in the tensioner housing, a adjustment apparatus for incrementally adjusting and limiting the working range of the tensioning piston, and a final position securing means for the captive arrangement of the tensioning piston in the piston bore. The transport securing means, the adjustment apparatus and the final position securing means together have a single securing ring for fastening the tensioning piston in the tensioner housing, (Continued)

the incremental adjustment and limiting of the working range of the tensioning piston and the captive arrangement of the tensioning piston. A chain drive, more particularly a control chain drive, of an internal combustion engine, having such a tensioning device is also provided.

17 Claims, 7 Drawing Sheets

(52) U.S. Cl.
CPC .............. *F16H 2007/0859* (2013.01); *F16H 2007/0893* (2013.01)

(58) Field of Classification Search
CPC ..... F16H 2007/0855; F16H 2007/0859; F16H 2007/0872; F16H 2007/0878; F16H 2007/0893
USPC ......................................................... 474/109
See application file for complete search history.

(56) References Cited

U.S. PATENT DOCUMENTS

| | | | | |
|---|---|---|---|---|
| 7,189,174 B2* | 3/2007 | Yamamoto | ............ | F16H 7/0836 474/109 |
| 7,571,632 B2* | 8/2009 | Yamamoto | ............ | F16H 7/0848 72/370.21 |
| 7,775,921 B2* | 8/2010 | Izutsu | ................ | F16H 7/0848 474/111 |
| 9,746,055 B2* | 8/2017 | Takagi | ................ | F16H 7/0848 |
| 2006/0270500 A1 | 11/2006 | Yamamoto et al. | | |
| 2010/0186528 A1* | 7/2010 | Hillen | ................ | F16D 7/048 192/56.6 |
| 2011/0028253 A1* | 2/2011 | Perissinotto | ......... | F16H 7/0848 474/135 |
| 2011/0183796 A1* | 7/2011 | Kurematsu | .......... | F16H 7/0848 474/110 |
| 2013/0190117 A1* | 7/2013 | Bauer | ................ | F16H 7/0848 474/111 |
| 2015/0024887 A1* | 1/2015 | Oh | ....................... | F16H 7/0848 474/110 |
| 2016/0061299 A1* | 3/2016 | Takagi | ................ | F16H 7/0848 474/101 |
| 2017/0205687 A1* | 7/2017 | Mitchell | ............. | F16M 11/105 |
| 2017/0370447 A1* | 12/2017 | Freemantle | .......... | F16H 7/0848 |

FOREIGN PATENT DOCUMENTS

| | | | |
|---|---|---|---|
| DE | 196 80 418 C1 | 11/2001 | |
| DE | 102 97 397 T5 | 2/2005 | |
| DE | 10 2011 101 865 A1 | 11/2011 | |
| DE | 202017100695 U1 * | 6/2018 | ............... F16H 7/08 |
| DE | 10 2017 127 808 A1 | 5/2019 | |
| FR | 3053427 A1 * | 1/2018 | ........... F16H 7/0848 |
| JP | 2005-235223 A | 9/2005 | |

\* cited by examiner

TENSIONING DEVICE WITH A SINGLE SECURING RING

CROSS-REFERENCE TO RELATED APPLICATIONS

This application is a National Stage of International patent application PCT/EP2020/074859, filed on Sep. 4, 2020, which claims priority to foreign German patent application Nos. DE 10 2019 123 816.1 and 10 2019 123 818.8, filed on Sep. 5, 2019, the disclosures of which are incorporated by reference in their entirety.

FIELD OF THE INVENTION

The present invention relates to a tensioning device, in particular a hydraulically actuated chain tensioner for a chain drive of an internal combustion engine, having a tensioner housing, a tensioning piston which is guided displaceably in a piston bore of the tensioner housing and has a piston skirt, a transport securing device for fastening the tensioning piston in the tensioner housing, an adjustment device for incrementally adjusting and limiting the working range of the tensioning piston, and an end position securing device for loss-proof arrangement of the tensioning piston in the piston bore. The invention also relates to a chain drive, in particular a timing chain drive of an internal combustion engine, with such a tensioning device.

BACKGROUND

Hydraulically actuated tensioning devices are widely used and are employed in various applications in the art, for example in timing chain drives in internal combustion engines. Such tensioning devices generally include a housing with a piston bore, in which a tensioning piston is arranged that is preloaded by means of a pressure spring. In combination with the piston bore of the housing, the hollow-cylindrical tensioning piston forms a pressure chamber, which is filled with hydraulic fluid to damp the retracting movement of the tensioning piston. The pressure chamber is connected via a check valve to a hydraulic fluid supply, usually the engine oil circuit of an internal combustion engine, to replace the hydraulic fluid escaping from the pressure chamber during operation. In addition to a transport securing device and an end position securing device for the tensioning piston, conventional tensioning devices frequently also have adjustment devices in the form of detent mechanisms that define a blocking and slipping direction for the tensioning piston, preventing the tensioning piston from entering the piston bore too deeply by means of a stop, but allowing the working range of the tensioning piston to be adjusted, for example in the event of chain wear.

A conventional tensioning device with an adjustment device is known, for example, from DE 100 14 700 A1. For adjustment of the working range, the piston skirt of the tensioning piston is provided with a sawtooth profiling, into which a ratchet block engages through a window cutout in the housing. The preloaded ratchet block allows the tensioning piston to slip through in the tensioning direction of the pressure spring and at the same time prevents the tensioning piston from moving too far into the piston bore of the housing in the case of relatively hard and powerful oscillation impacts. The free working range of the tensioning piston is determined by the axial freedom of movement of the ratchet block in the window cutout.

The tensioning device known from the publication DE 196 80 418 C1 has, in addition to an adjustment device of the working range of the tensioning piston, also a transport securing device. The adjustment device includes several axially spaced circumferential grooves, in which a detent collet engages that is slid onto the tensioning piston. A stop ring at the tensioning end of the piston bore displaces the detent collet, guided in two cutouts in the tensioner housing, on the grooves of the tensioning piston and also forms an end stop. The stop ring also serves to fix the transport securing clip, which in the transport position engages in a locking groove formed at the tensioning end of the tensioning piston. The free working range of the tensioning piston is defined between the stop ring and a lower stop slope formed in the piston bore of the housing.

DE 36 36 918 A1 shows a tensioning device, in which an expanding ring of an adjusting device is displaced from a profiled piston groove formed on the tensioning piston onto an adjusting profile formed in the piston bore in order to effect an adjustment of the tensioning piston. The free working range of the tensioning piston is defined by one profile section of the piston groove. Another profile section serves to secure the end position of the expansion ring in a locking groove in the piston bore. In order to fix the tensioning piston in a transport position, a securing ring located at the tensioning end of the tensioning piston is pushed through a gap between the housing and the tensioning piston into a locking groove, in which the securing ring is supported against a locking groove at the tensioning end of the piston bore. In order to deactivate the transport securing device, the tensioning piston is again pressed into the piston bore, causing the securing ring to spring back into its operating position at the tensioning end of the tensioning piston.

A generic tensioning device is known from DE 10 2011 101 865 A1, in which the tensioning piston has several axially spaced circumferential locking grooves. The detent ring arranged on this adjustment profile of the tensioning piston is guided in an adjustment groove in the piston bore of the housing with the adjustment groove defining the free working range of the tensioning piston. For incremental adjustment of the working range of the tensioning piston, the securing ring is moved from the adjustment groove into the subsequent locking groove of the adjustment profile. In order to fix the tensioning piston in a transport position, a transport securing clip is positioned through an opening in the tensioning housing in a locking groove provided at the tensioning end of the tensioning piston.

Conventional tensioning devices with a transport securing device, an adjustment device and/or an end position securing device are widely used in various designs and embodiments in technology and have proven themselves well in use. The corresponding concepts of the usual transport securing devices, adjustment devices and end position security devices are, however, sometimes relatively complicated in design with precise coordination and exact design of the necessary components for the respective function and require complex machining of the components of the tensioning device in order to ensure safe operation.

The large number of tensioning devices known in the prior art allows a selection based on the respective application and design. However, progressive technical development means that there is constant pressure to innovate and improve existing designs, even in the case of products that are already well established in the art. For this reason, there is also a constant need for optimization in view of the increasing cost pressure, particularly in the automotive industry, in conjunction with high volumes, and the endeavor to reduce costs through synergy effects.

In view of the disadvantages of the tensioning devices known in the prior art having a transport securing device, an adjustment device and an end position securing device, it is the object of the present invention to provide a tensioning device, the design of which enables cost-effective manufacture with safe functioning by means of a simple structure and simple handling.

SUMMARY OF THE INVENTION

According to the invention, this object is solved by the fact that the transport device, the adjustment device and the end position securing device in combination include a single securing ring for fastening the tensioning piston in the tensioner housing, for incrementally adjusting and limiting the working range of the tensioning piston and for loss-proof arrangement of the tensioning piston in the piston bore. Such a multifunctional securing ring reduces the necessary components of the tensioning device and thus also the production costs and at the same time avoids a malfunction in the interaction of the transport securing device, the adjustment device and the end position securing device of the tensioning device. In this case, the multifunctional securing ring is arranged essentially within the piston bore and is accessible only through generally possible cutouts or windows in the tensioner housing. Advantageously, the tensioning device is a screw-in tensioner, in which the transport securing device is unlocked and the individual securing ring is transferred to the adjusting device by pushing the tensioning piston into the piston bore against the pre-loading of a pressure spring. In order to use a single securing ring for the transport securing device, the adjustment device and the end position securing device, these functions of the tensioning device are adapted to the individual securing ring and the necessary grooves and profiles are positioned accordingly in the piston bore and on the piston skirt of the tensioning piston. Apart from the single securing ring, the transport securing device, the adjustment device and the end position securing device of a tensioning device according to the invention do not include any further components movable relative to the tensioning piston and the piston bore of the tensioner housing.

The favorable design provides that the adjusting device has an adjusting profile formed on the piston skirt of the tensioning piston with a plurality of locking grooves, in which the securing ring is arranged during operation for adjusting the working range of the tensioning piston, and has an adjusting groove formed in the piston bore, the adjusting profile being arranged on the distal end of the tensioning piston. The usual design of the adjustment profile with several grooves on the distal end of the tensioning piston facilitates the use and safe function of the single securing ring for the transport securing device, the adjustment device and the end position securing device of the tensioning device. In this context, the arrangement of the adjustment profile mainly on the distal end of the piston skirt, i.e. the half of the piston skirt facing away from the tensioning-side end of the tensioning piston, enables protection of the adjustment profile formed on the piston skirt by the piston bore of the tensioner housing during operation of the tensioning device over most of the operating conditions, as well as low-friction guidance of the smooth, tensioning-side part of the piston skirt in the piston bore. Appropriately, the transport securing profile is formed proximally adjacent to the adjustment profile on the piston skirt of the tensioner piston to allow a simple and fast transition to an operating position after unlocking the transport securing device. For ease of manufacture and reliable operation, the adjustment groove formed in the piston bore is designed with a straight bottom extending in parallel to the piston bore, a radially perpendicular tensioning-side adjustment flank and an inclined distal stop flank.

Furthermore, the piston skirt at the tensioning-side end of the tensioning piston may be formed as a smooth guide region without profile, the guide region without profile extending from the tensioning-side proximal end of the tensioning piston, i.e. from the pressure head, over at least 35%, preferably at least 40%, in particular at least 45% of the axial length of the tensioning piston. In rare cases, the guide region without profile may extend from the tensioning-side proximal end of the tensioning piston over at least 20% of the axial length of the tensioning piston. Such a smooth, cylinder jacket without profile allows low-friction guidance of the tensioning piston in the cylinder bore of the tensioner housing. In addition, the profiling provided at the distal end of the tensioning piston for the transport securing device, the adjustment device and the end position securing device are protected by the piston bore of the tensioner housing over most of the operating conditions, since depending on the arrangement of the transport securing device groove and the adjustment profile on the distal end, or distal half, of the tensioning piston, the profiled area only protrudes from the piston bore when the tensioning piston is in extremely extended positions. This ensures that the profiled area of the piston skirt is protected by the tensioner housing over most of the operating conditions.

A simple embodiment provides for the adjustment profile to have a plurality of grooves running around and axially adjacent to one another in the piston skirt of the tensioning piston. In this way, the adjustment profile may be produced very inexpensively at the distal end of the piston skirt and may be formed relatively simply in accordance with the function of the adjustment device for incremental adjustment of the working range of the tensioning piston. Preferably, the axially juxtaposed grooves are formed as a circumferential, preferably rounded, sawtooth profile, so as to enable not only simple displacement into the next detent position but also reliable locking of the tensioning piston in the event of the tensioning piston entering the piston bore too deeply. Straight surfaces between the saw teeth provide a certain working range between the detent positions specified by the sawtooth profile.

Preferably, the distance between a tensioning-side opening of the piston bore in the tensioner housing and the adjustment groove formed in the piston bore may be at least 25%, preferably at least 30%, of the axial length of the tensioning piston. The opening on the tensioning side is the open end of the piston bore without a radial limitation of the tensioning piston by the housing, whereby windows or cuts in the tensioner housing or projections of the tensioner housing without contact with the tensioning piston are not taken into account. Such a large distance between the tensioning-side opening of the piston bore and the adjustment groove allows the tensioning piston to be guided reliably in the piston bore of the tensioner housing, in particular the profile-free proximal end of the tensioning piston.

A preferred embodiment of the transport securing device has a transport securing profile formed on the piston skirt of the tensioning piston, in which the securing ring is arranged in a transport securing device position, and further has a transport securing device groove at the tensioning-side end of the piston bore. Together with the multifunctional securing ring, the transport securing profile and the transport securing groove allow the tensioning piston to be fastened in the tensioner housing in a transport securing position and the transport securing device to be unlocked correspondingly easily by pressing the tensioning piston into the piston bore. To activate the transport securing device, the bore opening of the piston bore at the tensioning-side end of the tensioner housing is provided with an insertion slope. This insertion slope or chamfer at the transition of the piston bore to the face end facilitates the positioning and reception of the securing ring in the transport securing profile on the piston skirt of the tensioning piston in order to activate the transport securing device when the tensioning piston is pressed in.

In an advantageous embodiment the end position securing device has an end position securing groove formed on the piston skirt of the tensioning piston, in which the securing ring is arranged in an end position. In this case, the end position securing groove is usually formed distally to the adjustment profile, in particular adjacent to the adjustment profile on the piston skirt. The use of the single securing ring in the end position securing groove prevents a functional collision with the transport securing device and the incremental adjustment of the working range. In contrast to the end position securing devices of conventional tensioning devices, the vertical adjustment flank of the adjustment groove formed in the piston bore may be used here as a stop for the securing ring to secure the tensioning piston against loss.

In a useful modification the securing ring is designed as a securing clamping ring, the securing clamping ring being arranged on the tensioning piston in a pre-tensioned manner relative to the piston skirt. Such a securing clamping ring, which in a simple form may be configured as an open, radially resilient ring and may have, for example, a gap between two ring ends, enables safe functioning of the adjusting device, but also of the transport securing device and the end position securing device. The securing clamping ring is preloaded relative to the undisturbed outer circumference of the piston skirt, corresponding approximately to the diameter of the piston bore, and also enables a reliable fit on the groove bottoms of the transport securing profile, whereby in this case only a minimal to no clamping action is required.

In a variant the securing ring is configured as an open spring ring with two facing end faces at the ends of the open spring ring. The two end faces face each other axially, i.e. lie opposite each other along a curved longitudinal axis of the spring ring. An open spring ring with two end faces facing each other at the ends of the ring may be produced very easily and inexpensively, whereby the open spring ring may be configured both as a securing clamping ring and as an expanding ring. The open spring ring, usually a circular ring with a slot and a circular ring cross-section, may be manufactured very simply and inexpensively and nevertheless enables reliable functioning of the adjusting device as well as the transport securing device and the end position securing device.

In another embodiment, the two facing end faces at the ends of the open spring ring are inclined relative to a center line. The center line is a straight line extending from the center of the end face through the center of the securing ring. Compared with straight ends in the direction of the central straight line, inclined end faces allow better overlap of the ring ends and thus reliable interaction of the profiles and grooves of the adjustment device as well as the transport securing device and the end position securing device in the piston bore and on the piston skirt of the tensioning piston. In addition, this reduces the risk of protruding burs on the facing end faces and corresponding damage to the surface of the piston skirt and the piston bore. The combination of features of this claim could also enjoy protection independently of any of the preceding claims and be pursued independently.

Preferably, the angle of the inclined end faces at the ends of the open spring ring relative to the central straight line may be between 20° and 60°, preferably between 30° and 40°, particularly preferably 45°. The inclined end faces at the ends of the open spring ring enable the tips of the inclined end faces to slide easily over one another by means of a corresponding angle to the center line when the securing ring is mounted on the tensioning piston and when the transport securing device is activated. This reduces the risk of jamming of the securing ring during assembly and operation of the tensioning device, while allowing the sliding over each other of the inclined end faces both axially and radially. Preferably axial sliding over one another takes place. In this way, the distance between the ends of the open spring ring may be kept small. It is appropriate for the two inclined end faces at the ends of the open spring ring to be arranged parallel to one another.

In a particular embodiment the tensioner housing has an engagement opening in the area of the adjustment groove to enable the adjustment device to be reset. By preventing the adjustment ring from resting against the inclined stop flank of the adjustment groove, for example by blocking the adjustment ring by means of a suitable tool, such an engagement opening enables the adjustment ring to move backwards over the adjustment profile when the tensioning piston is engaged in the piston bore. This allows the tensioner to be returned to an operating position adapted to the chain drive after disassembly. The combination of features of this claim could also enjoy protection independently of any of the preceding claims and be pursued independently.

Advantageously, the engagement opening in the tensioner housing may be formed as a bore, preferably as a bore extending through the tensioner housing. Such a bore may be made very simply and inexpensively in the manufacture of the tensioner housing, whereby instead of one bore passing through the tensioner housing, two engagement openings may also be made at the same time on opposite sides of the adjusting groove. The diameter of the bore for forming the engagement opening in the tensioner housing may correspond to the diameter of the supply bore of the hydraulic fluid to the pressure chamber of the tensioner and preferably be provided at the same radial position of the tensioner housing. Using the same diameters for different bores and providing the bores at the same radial position of the tensioner housing reduces the work steps in the production of the tensioner housing and thus at the same time also the production costs.

In one modification the tensioning device is configured as a screw-in tensioner. A screw-in tensioner enables simple and secure installation of the tensioning device in the engine block of an internal combustion engine.

Preferably, the thread profile on the tensioner housing may extend over both axial sides of an engagement opening on the tensioner housing. In addition to the simple mounting of a screw-in tensioner in the engine block, a thread profile extending on both sides of the engagement opening for screwing the tensioner into an opening in the engine block enables additional sealing of the engagement opening with respect to the open engine chamber, wherein the engagement opening communicates with the pressure chamber of the tensioner via the leakage gap between the tensioning piston and the piston bore.

Furthermore, the present invention relates to a chain drive, in particular a timing chain drive of an internal combustion engine with a drive sprocket, at least one output sprocket, a drive chain connecting the drive sprocket and the at least one output sprocket to one another, and a tensioning device according to one of the embodiments described above for tensioning the drive chain. Due to the special design of the tensioning device, this chain drive may provide a reliable pretensioning of the drive chain with a reliable adjustment function for incrementally adjusting the tensioning piston and limiting the retraction movement, as well as a safe transport securing and end position securing, despite a simple and inexpensive configuration. Accordingly, in addition to ease of installation and operation, such a chain drive may prevent skipping of the drive chain.

BRIEF DESCRIPTION OF THE DRAWINGS

In the following, embodiments of the present invention are explained in more detail with reference to drawings. In the drawings.

DETAILED DESCRIPTION

Figure 1:
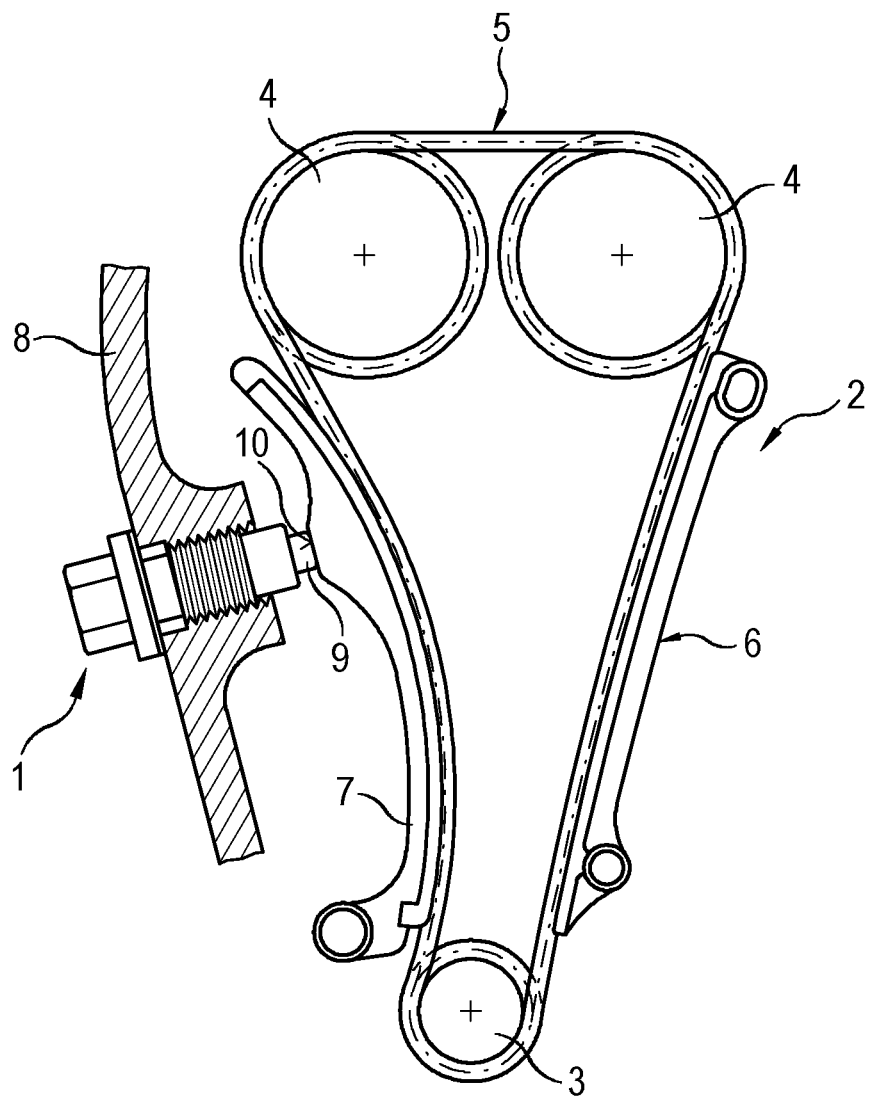
FIG. 1 shows a chain drive for an internal combustion engine according to the present invention.

A tensioning device 1 according to the present invention is used in a chain drive 2 of an internal combustion engine, as shown in FIG. 1. This chain drive 2 is here a timing chain drive with a lower crankshaft drive sprocket 3 and two upper camshaft output sprockets 4 arranged side by side, as well as a drive chain 5. The drive chain 5 is laid endlessly around the drive sprocket 3 and the output sprockets 4 and connects them to each other. A guide rail 6 is provided in the load-carrying section of the chain drive 2, along which the drive chain 5 slides. On the opposite return strand of the chain drive 2 there is a tensioning rail 7 pivotably mounted in the vicinity of the drive sprocket 3, which may be pressed against the drive chain 5 by means of the tensioning device 1, so as to pretension the return strand of the chain drive 2. In the present embodiment of the chain drive 2 in FIG. 1, the tensioning device 1 is configured as a screw-in tensioner that is screwed into a corresponding opening of the engine block 8 in order to press with its tensioning piston 9 onto a pressure area 10 of the tensioning rail 7, which is thus pressed against the drive chain 5 with a predetermined force. Alternatively, the tensioning device 1 may also be configured as a flange tensioner, which is flange-mounted to the engine block 8 by suitable fastening means.

Figure 2:
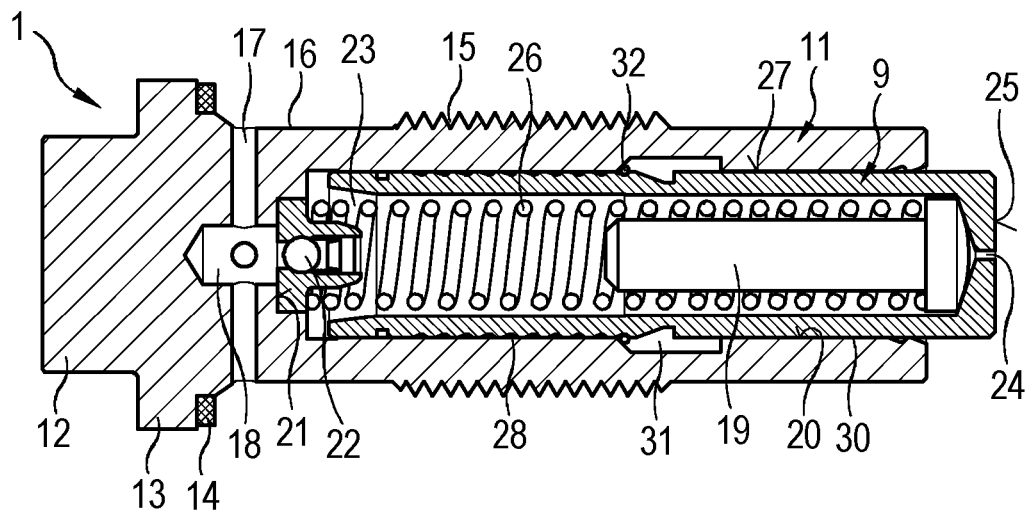
FIG. 2 shows an enlarged sectional view of the tensioning device according to the present invention of FIG. 1 in an operating position.

The enlarged sectional view of the tensioning device 1 according to the invention in FIG. 2 clearly shows the tensioner housing 11, which is configured as a screw-in tensioner, as well as the tensioning piston 9. The tensioner housing 11 is manufactured here as a lathe-milled part and has a hexagonal screw head 12 with a contact flange 13, by means of which the tensioning device 1 is screwed into the corresponding opening in the engine block 8. Below the contact flange 13, there is provided a ring seal 14 of rectangular cross-section so as to seal the tensioning device 1 screwed into the engine block 8 from the environment. Between the ring seal 14 and the threaded profile 15 on the tensioner housing 11, a supply section 16 with a smaller outer diameter is provided, via which the tensioning device 1 is supplied with hydraulic fluid, i.e. with engine oil. A supply bore 17 extending radially to the housing axis connects the supply section 16 to a prechamber 18 in the interior of the tensioner housing 11. At the bottom of the piston bore 20 there is a valve seat 21 for a check valve 22, via which engine oil may flow from the prechamber 18 into the pressure chamber 23 formed between the tensioning piston 9 and the tensioner housing 11.

The tensioning piston 9, which is configured as a hollow cylindrical component, is received in the piston bore 20 of the tensioner housing 11, thereby enabling longitudinal movement thereof. The tensioning piston 9 is pretensioned in the longitudinal direction of the tensioning device 1 by means of a helical pressure spring 26 arranged in the pressure chamber 23, wherein the tensioning piston 9, as a hollow cylindrical component, is provided with a pressure head 25 closed on the tensioning side except for a central vent opening 24. A packing 19 is further provided in the hollow-cylindrical tensioning piston 9, which reduces the volume of the pressure chamber 23 and seals off the end face vent opening 24 from the pressure chamber 23 filled with hydraulic fluid. For this purpose, the head of the packing 19 is pressed against the pressure head 25 at the tensioning-side end of the tensioning piston 9 by the pressure spring 26, which is supported against the check valve 22, so that the vent opening 24 is in throttled fluid communication with the pressure chamber 23.

Figure 3:
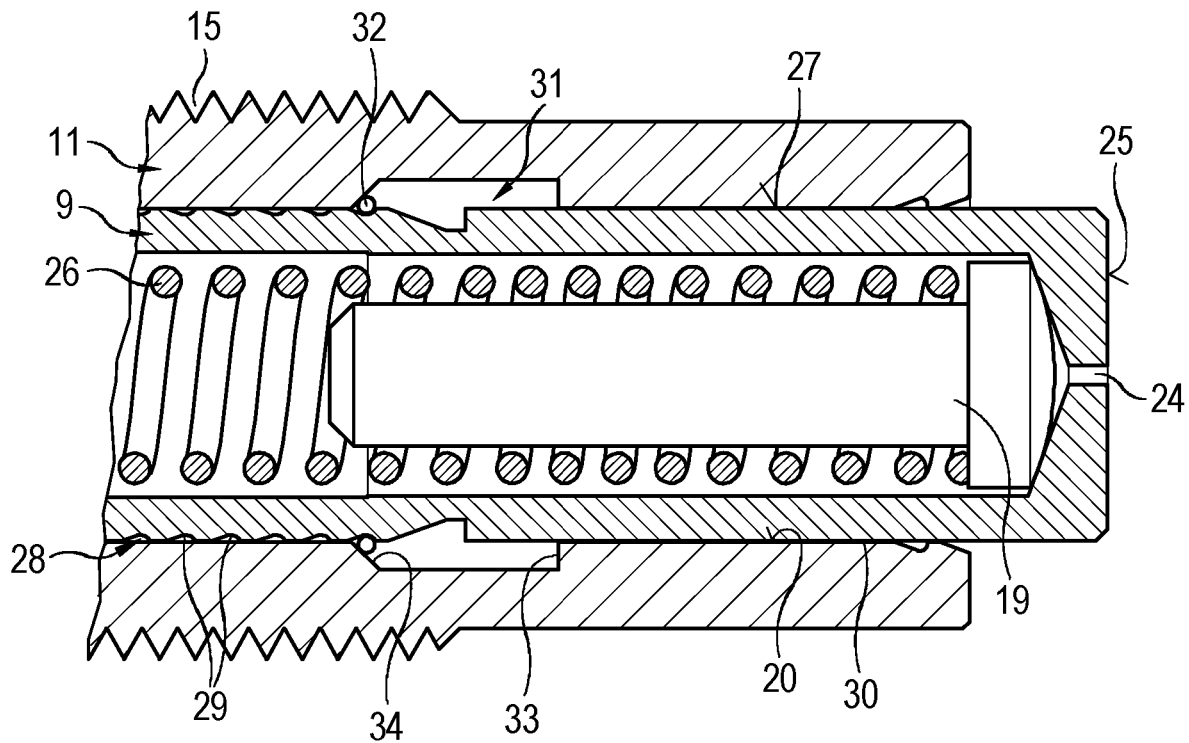
FIG. 3 shows an enlarged partial view of the tensioning device of FIG. 2 in the first adjustment position.

The tensioning piston 9 has on its outer piston skirt 27 at a distal region facing away from the pressure head 25, i.e. at the rear end of the tensioning piston 9 in the tensioning direction, an adjustment profile 28 with a plurality of locking grooves 29 arranged next to one another in the longitudinal direction. The contour of the adjustment profile 28 is sawtooth-shaped, with the tips between the detent grooves 29 being flattened. The outer diameter of the piston skirt 27 has the same diameter at the flattened tips of the adjustment profile 28 as the profile-free guide region 30 of the tensioning piston 9 at the proximal end of the tensioning piston 9, which is at the front in the tensioning direction. This allows improved guidance of the tensioning piston 9 in the piston bore 20, in particular also in the distal area of the piston skirt 27. The profile-free guide region 30 with the constant maximum outer diameter of the tensioning piston 9 not only enables reliable low-friction guidance of the tensioning piston 9 in the piston bore 20 of the tensioner housing 11, but also supports the adjustment profile 28 without tilting in the piston bore 20 for most of the operating states of the tensioning device 1, since the adjustment profile 28 does not protrude from the piston bore 20 until the tensioning piston 9 is in an extremely extended position. The adjustment profile 28 on the piston skirt 27 of the tensioning piston 9, together with the adjustment groove 31 formed in the piston bore 20 and the securing ring 32 arranged in the adjustment groove 31, form the adjustment device for incremental adjustment and limitation of the working range of the tensioning piston 9. The free working range of the tensioning piston 9, in which the tensioning device 1 provides its damping effect during operation, is defined by the axial length of the adjustment groove 31 between the tensioning-side adjustment flank 33 that extends radially perpendicular to the straight bottom of the adjustment groove 31 and the inclined distal stop flank 34. When the securing ring 32 is in contact with the tension-side adjustment flank 33, the securing ring 32 is pressed into the subsequent detent groove 29 of the adjustment profile 28 when the tensioning piston 9 is further extended from the piston bore 20, in order to adjust the working range of the tensioning piston 9 in the event of wear of the drive chain 5. When the securing ring 32 is in contact with the inclined stop flank 34 as shown in FIG. 2, the securing ring 32 is pressed into the respective detent groove 29 and blocked to prevent the tensioning piston from entering the piston bore 20 too deeply. The enlarged representation of the adjusting device from FIG. 2 shown in FIG. 3 clearly illustrates the contact of the securing ring 32 in the first notch groove 29 of the adjusting profile 28 after a start-up of the tensioning device 1.

Figure 4:
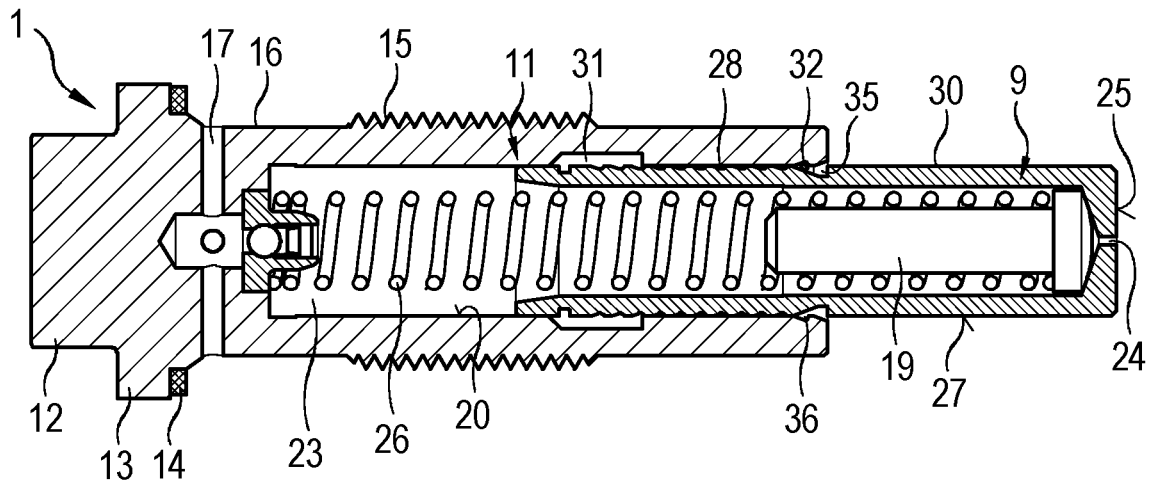
FIG. 4 shows an enlarged sectional view of the tensioning device from FIG. 1 according to the invention in a transport position.
Figure 5:
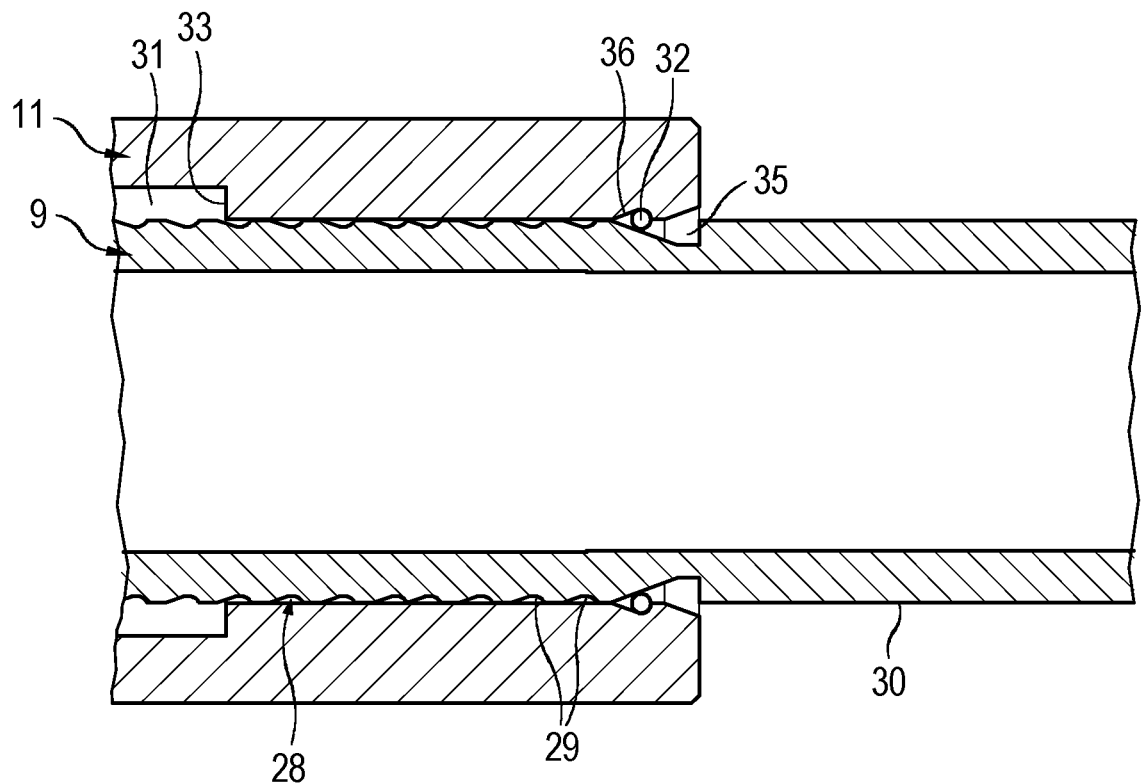
FIG. 5 shows an enlarged schematic view of the components of the transport securing device from FIG. 4.

In the tensioning-side end of the tensioner housing 11, a transport securing device is provided in the opening of the piston bore 20. As shown in FIG. 4, the transport securing device includes a transport securing profile 35 formed on the piston skirt 27 of the tensioning piston 9 and a transport securing groove 36 formed at the tensioning-side end of the piston bore 20, as well as the securing ring 32, which is also used in operation to adjust and limit the working range of the tensioning piston 9. The tensioning-side open end of the piston bore 20 is thereby slightly chamfered or beveled in order to facilitate activation of the transport securing device when the tensioning device 1 is assembled. The transport securing profile 35 on the piston skirt 27 of the tensioning piston 9 is arranged between the guide region 30 and the adjustment profile 28 directly adjacent to the adjustment profile 28, see also FIG. 5. When the transport securing is activated, the securing ring 32 is pressed almost completely into the transport securing profile 35 through the chamfered opening of the piston bore 20, so that when the tensioning piston 9 is pushed in further, the securing ring 32 slides into the transport securing groove 36 and expands slightly there again. In the transport position, the securing ring 32 is simultaneously in engagement with the tensioning-side end of the transport securing groove 36 and the chamfered distal flank of the transport securing profile 35.

Figure 6:
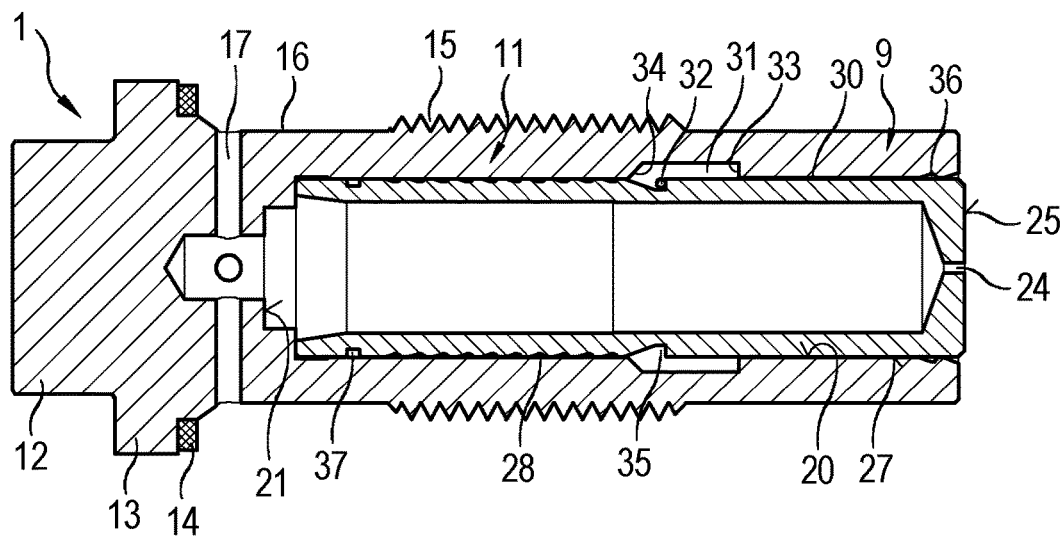
FIG. 6 shows a schematic view of the tensioning device from FIG. 4 during the transition from the transport securing position to the operating position.
Figure 7:
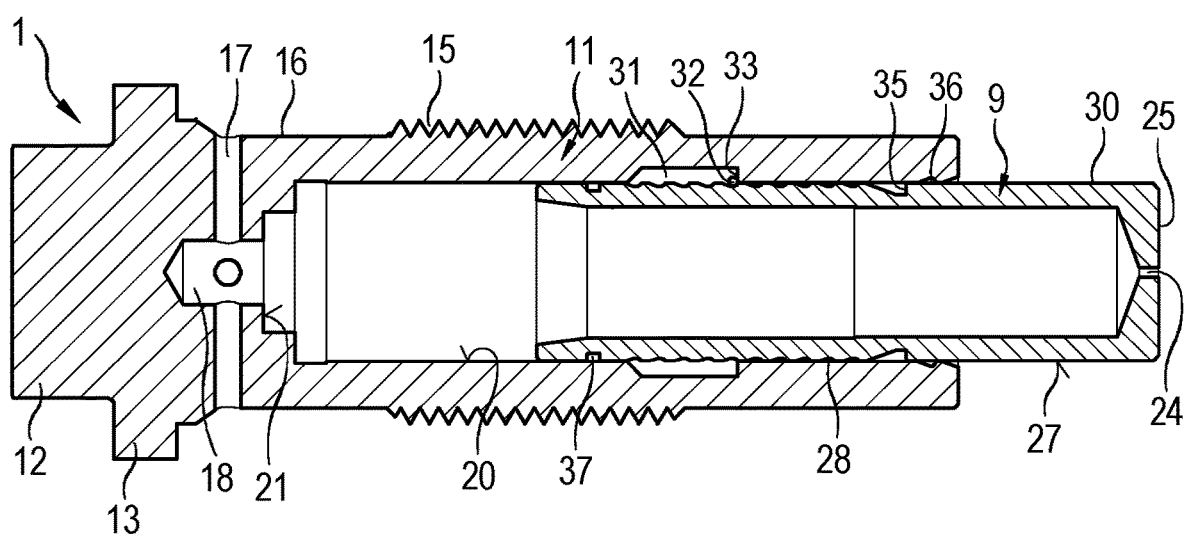
FIG. 7 shows a schematic view of the tensioning device from FIG. 2 in an extended operating position.

As is evident from the transport position of the tensioning device 1 shown in FIG. 4, the tensioning piston 9 protrudes with the guide region 30 far out of the piston bore 20 when the transport securing device is activated, so that the pressure spring 26 is only slightly preloaded. This reduces both the risk of unintentional unlocking of the transport securing device and the risk of injury in the event of accidental unlocking of the transport securing device. For unlocking the transport securing device and corresponding to a start-up of the tensioning device 1, the tensioning piston 9 is pressed from the transport or locking position shown in FIG. 4 against the pretensioning force of the pressure spring 26 into the piston bore 20. Since the tensioning piston 9 projects relatively far from the piston bore 20 in the locking position, only a relatively small compressive force must be applied to unlock it. When the tensioning piston 9 is pressed into the piston bore 20, the securing ring 32 is first pressed into the transport securing profile 35 by the flattened distal end of the transport securing groove 36 and then carried along by the transport securing profile 35 until the securing ring 32 expands back into the adjustment groove 31, see also FIG. 6. Upon subsequent disengagement of the tensioning piston 9 from the piston bore 20, the securing ring 32 is then pushed by the adjusting flank 33 of the adjusting groove 31 onto the first detent groove 29 of the adjusting profile 28, see FIG. 3. When the tensioning piston 9 is further disengaged from the piston bore 20, the securing ring 32 is pushed farther and farther along the adjustment profile 28 onto the following detent grooves 29 until the pressure head 25 rests against the clamping rail 7 or compensates for elongation of the drive chain 5 due to wear, see FIG. 7. The guide region 30 of the tensioning piston 9 is still visible in the central operating position shown in FIG. 7, so that both the transport securing profile 35 and the adjustment profile 28 in the piston bore 20 are protected against external influences and the tensioning piston 9 is reliably guided in the piston bore 20 of the tensioner housing 11.

Figure 8:
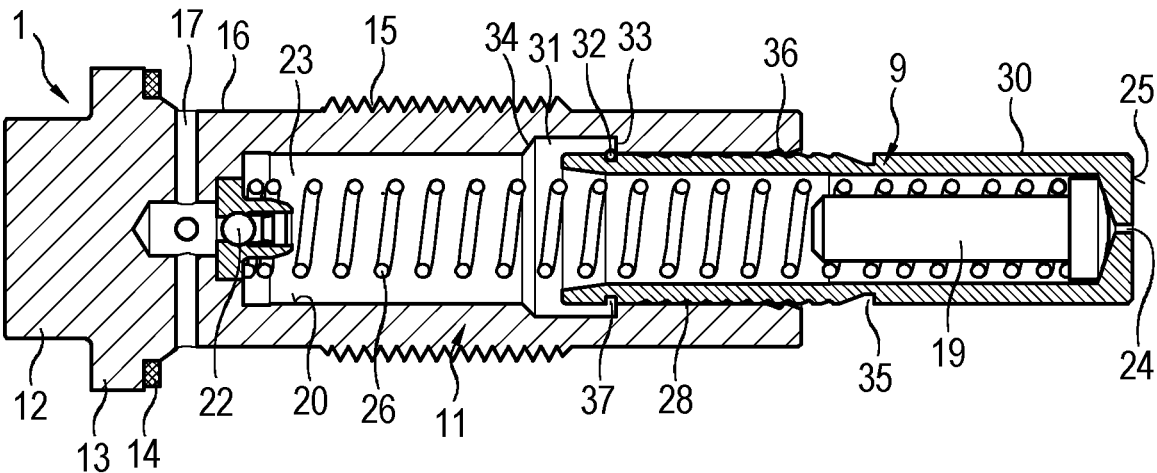
FIG. 8 shows an enlarged sectional view of the tensioning device from FIG. 1 in an end position securing position.
Figure 9:
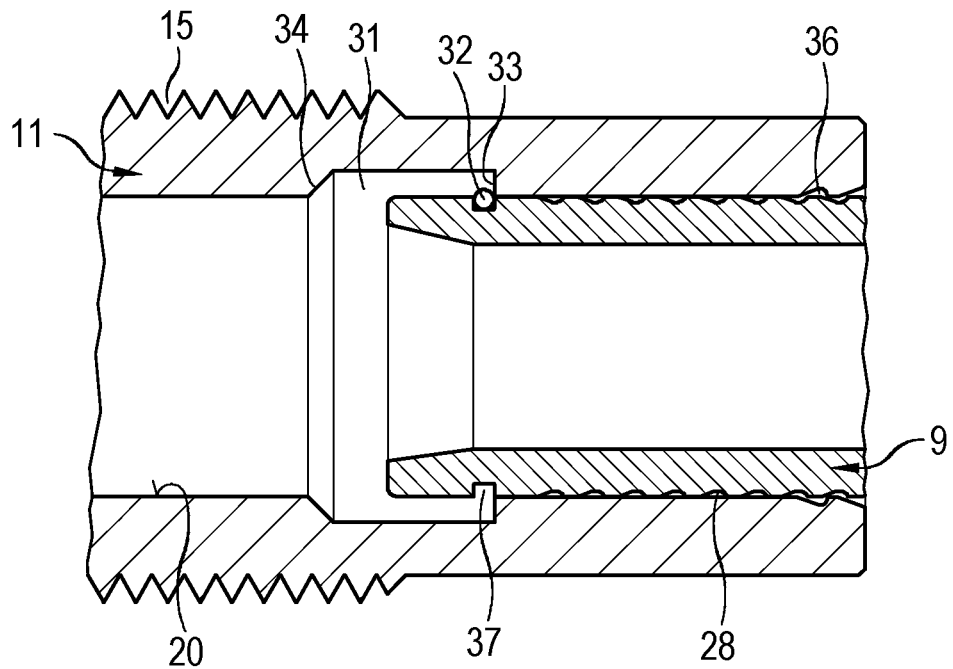
FIG. 9 shows an enlarged schematic view of the components of the end position securing device from FIG. 8.

In FIGS. 8 and 9, the structure and function of the end position securing device of the tensioning piston 9 in the piston bore 20 is explained in more detail. In the end position shown in FIG. 8, the tensioning piston 9, which is preloaded in the tensioning direction by the pressure spring 26, protrudes maximally from the piston bore 20, whereby, in addition to the guide region 30, the transport securing profile 35 provided in the center of the tensioning piston 9 and part of the distal adjustment profile 28 on the piston skirt 27 also protrude from the piston bore 20. The jointly used securing ring 32 is thereby positioned in the end position securing groove 37 formed at the distal end of the piston skirt 27. The portion of the securing ring 32 projecting relative to the piston skirt 27 abuts the straight adjustment flank 33 of the adjustment groove 31 in the piston bore 20 and prevents further extension of the tensioning piston 9 relative to its end position in the piston bore 20. At the end of the usual operating life time of a chain drive 2, in the event of excessive elongation of the drive chain 5, the securing ring 32 is pushed into the end position securing groove 37 by the adjustment flank 33 of the last distal detent groove 29 of the adjustment profile 28 in the event of further extension of the tensioning piston 9 from the piston bore 20. During a subsequent operational single movement of the tensioning piston 9, the securing ring 32 located in the end position securing groove 37 may move over the axial length of the adjustment groove 31 to the inclined stop flank 34 in the normal working range of the tensioning piston 9. In accordance with the configuration of the end position securing groove 37 with vertical radially extending flanks shown in FIG. 9, the securing ring 32 remains in the end position securing groove 37 even in the event of contact with the vertical adjustment flank 33 and prevents further engagement of the tensioning piston 9 in the piston bore 20. When the tensioning device 1 is disassembled from the engine block part 8 to replace or repair the chain drive 2, the securing ring 32 positioned in the end position securing groove 37 prevents the tensioning piston 9 from falling out or jumping out of the piston bore 20. In the embodiment of the tensioning device 1 shown in FIG. 8, the securing ring 32 positioned in the end position securing groove 37 also prevents the tensioning piston 9 from returning to an operating position or to the transport position. Accordingly, when the chain drive 2 is repaired or replaced, the tensioning device 1 must also be replaced.

Figure 10:
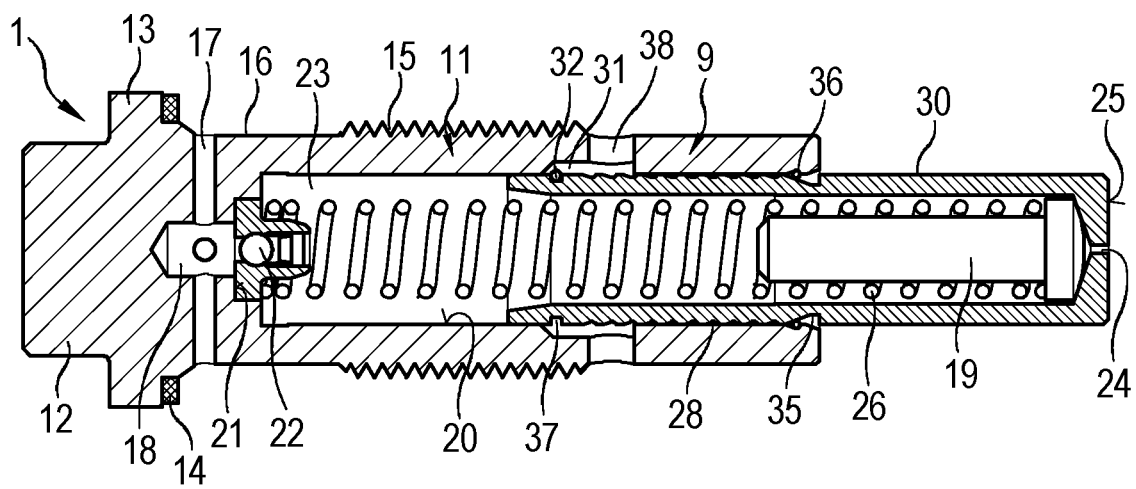
FIG. 10 shows an enlarged sectional view of the tensioning device according to the invention for a chain drive from FIG. 1 in another embodiment.

FIG. 10 shows another embodiment of the tensioning device 1 for a chain drive 2 according to the invention in an enlarged sectional view. Compared to the embodiment of the tensioning device 1 shown in FIG. 2, an engagement opening 38 in the form of a bore through the tensioner housing 11 is provided here in the area of the adjustment groove 31. This engagement opening 38 permits, in an end position of the tensioning piston 9, i.e., when the securing ring 32 is in contact with the end position securing groove 37, for example after removal of the tensioning device 1 from the engine block part 8, access to the securing ring 32 from the outside through the tensioner housing 11. If necessary, this allows both disassembly of the tensioning device into its individual parts by levering the securing ring 32 out of the end position locking groove 37 and displacing it in the direction of the distal end of the tensioning piston 9, and a return of the tensioning piston 9 to an operating position or transport securing position. For this purpose, the securing ring 32 may be levered out of the end position securing groove 37 through one or both engagement openings 38 on the opposite sides of the tensioner housing 11 with a simple tool, for example a screwdriver, and held at a distance from the inclined stop flank 34 of the adjustment groove 31, so that when the tensioning piston 9 is pressed into the piston bore 20, the securing ring 32 may be moved over the locking grooves 29 of the adjustment profile 28 to the transport securing profile 35 in the piston skirt 27 of the tensioning piston 9. With the position of the securing ring 32 in the transport securing profile 35, via a corresponding pressure on the securing ring 32, the latter may also be guided as far as the transport securing groove 36 at the tensioning-side end of the piston bore 20, in which the securing ring 32 then holds the tensioning piston 9 in a transport position.

Figure 11:
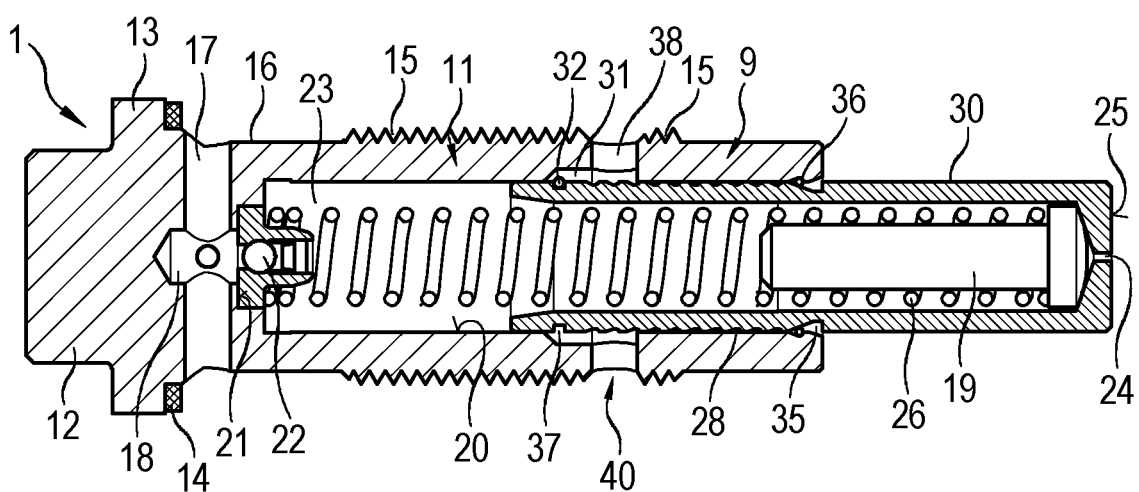
FIG. 11 shows an enlarged sectional view of the tensioning device according to the invention for the chain drive from FIG. 1 in a further embodiment.

Another embodiment of a tensioning device 1 with an engagement opening 38 is shown in FIG. 11. In this case, the threaded section 15 on the outer circumference of the tensioner housing 11 extends over both sides of the engagement opening 38, so that the area filled with hydraulic fluid between the adjusting groove 31 and the engagement opening 38 up to the engine block part 8 is sealed off from the surroundings and the interior of the internal combustion engine during operation of the tensioning device. This area filled with hydraulic fluid may therefore be used in operation as a reservoir 40 for hydraulic fluid, or engine oil, from which hydraulic fluid may return to the pressure chamber 23 via the inlet holes 17 and the check valve 22 in the event of a restricted or interrupted hydraulic fluid supply.

Figure 12:
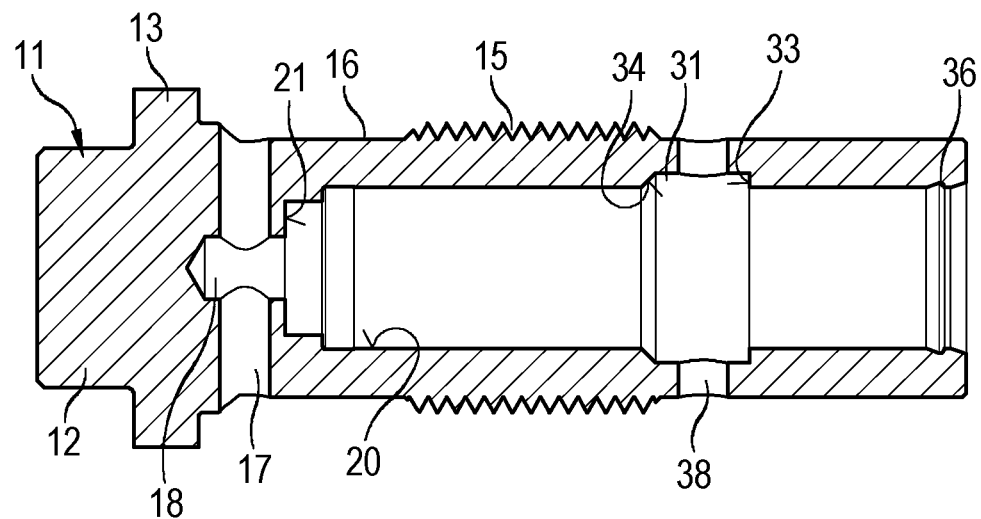
FIG. 12 shows a schematic view of the tensioner housing of the tensioning device of FIG. 11 in a second embodiment.

FIG. 12 shows an alternative of a tensioner housing 11 for the embodiment of a tensioning device 1 with engagement opening 38 shown in FIG. 10. In this tensioner housing 11, the supply bore 17 for supplying hydraulic fluid to the pressure chamber 23 has the same diameter as the engagement opening 38 to the adjustment groove 31, which is formed as bores. Furthermore, the supply bores 17 and the bores of the engagement openings 38 are formed at the same radial position of the tensioner housing 11, so that when the tensioner housing 11 is manufactured, the supply bore 17 and the engagement opening 38 may not only be manufactured with the same tool, but also without changing the radial position of the tensioner housing 11 relative to the tool.

Figure 13:
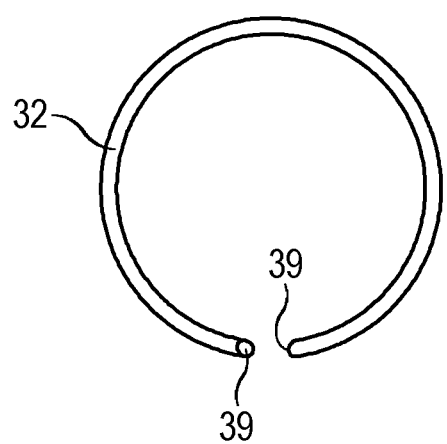
FIG. 13 shows a schematic view of a securing clamping ring.

FIG. 13 a schematic view of an embodiment of the single securing ring 32 that is configured both for fastening the tensioning piston 9 in the tensioner housing 11 with the transport securing device, for incrementally adjusting and limiting the working range of the tensioning piston 9 by means of the adjustment device and for loss-proof arrangement of the tensioning piston 9 in the piston bore by means of the end position securing groove. Unlike conventional single-slotted rings, this securing ring 32 has two facing end faces 39 at the ends of the open securing ring 32, which are inclined with respect to a central straight line from the center of the end face 39 to the center of the securing ring 32. These inclined end faces 39 allow the tips of the inclined end faces 39 to slide over each other during assembly and during incremental adjustment of the working range of the tensioning piston 9, and correspondingly provide for a smaller gap between the end faces 39 without impairing the function and action of the securing ring 32.

LIST OF REFERENCE SIGNS

1 Tensioning device
2 Chain drive
3 Drive sprocket
4 Output sprocket
5 Drive chain
6 Guide rail
7 Tensioning rail
8 Engine block
9 Tensioning piston
10 Pressure area
11 Tensioner housing
12 Screw head
13 Contact flange
14 Ring seal
15 Thread profile
16 Supply section
17 Supply bore
18 Pre-chamber
19 Packing
20 Piston bore
21 Valve seat
22 Check valve
23 Pressure chamber
24 Vent hole
25 Pressure head
26 Pressure spring
27 Piston skirt
28 Adjustment profile
29 Detent grooves
30 Guide region
31 Adjusting groove
32 Securing ring
33 Adjusting flank
34 Stop flank
35 Transport securing profile
36 Transport securing groove
37 End position securing groove
38 Engagement opening
39 End faces
40 Reservoir

The invention claimed is:

1. A tensioning device comprising a tensioner housing, a tensioning piston that is guided displaceably in a piston bore of the tensioner housing and has a piston skirt, a transport securing device for fastening the tensioning piston in the tensioner housing, an adjustment device for incrementally adjusting and limiting the working range of the tensioning piston, and an end position securing device for loss-proof arrangement of the tensioning piston in the piston bore,
wherein the transport securing device, the adjustment device and the end position securing device jointly comprise a single securing ring for fastening the tensioning piston in the tensioner housing, for incrementally adjusting and limiting the working range of the tensioning piston and for loss-proof arrangement of the tensioning piston in the piston bore,
the adjustment device comprises an adjusting profile formed on the piston skirt of the tensioning piston and having a first plurality of grooves, on which the securing ring is arranged in operation for adjusting the working area of the tensioning piston, and comprises an adjusting groove formed in the piston bore, the adjusting profile being arranged on the distal end of the tensioning piston, and
the transport securing device has a transport securing profile formed on the piston skirt of the tensioning piston, in which the securing ring is arranged in a transport securing device position, and has a transport securing groove at the tensioning-side end of the piston bore, and
wherein the piston skirt at the tensioning-side end of the tensioning piston is configured as a smooth profile-free guide region, wherein the smooth profile-free guide region extends between the tensioning-side end of the tensioning piston and the adjusting profile formed on the piston skirt over at least 35% of the axial length of the tensioning piston, and
the piston bore at the tensioning-side end of the tensioner housing is configured as a smooth profile-free bore region, wherein the smooth profile-free bore region extends between the transport securing groove at the tensioning-side end of the piston bore and the adjusting groove, the distance between the tensioning-side opening of the piston bore in the tensioner housing and the adjusting groove formed in the piston bore over at least 25% of the axial length of the tensioning piston, wherein guiding of the smooth profile-free guide region of the tensioning piston along the smooth profile-free bore region of the tensioner housing allows low-friction guidance of the tensioning piston in the cylinder bore and ensures that the adjusting profile formed on the piston skirt of the tensioning piston is protected by the tensioner housing over most of the operating conditions.

2. The tensioning device according to claim 1, wherein the profile-free guide region extends from the tensioning-side end of the tensioning piston over at least 40% of the axial length of the tensioning piston.

3. The tensioning device according to claim 1, wherein the adjusting profile has a second plurality of grooves extending around the piston skirt of the tensioning piston and arranged next to one another.

4. The tensioning device according to claim 1, wherein the end position securing device has an end position securing groove formed on the piston skirt of the tensioning piston, wherein the securing ring is arranged in an end position.

5. The tensioning device according to claim 1, wherein the securing ring is configured as a securing clamping ring, wherein the securing clamping ring is arranged on the tensioning piston in a pretensioned manner with respect to the piston skirt.

6. The tensioning device according to claim 1, wherein the securing ring is configured as an open spring ring with two mutually facing end faces at the ends of the open spring ring.

7. The tensioning device according to claim 6, wherein the two mutually facing end faces at the ends of the open spring ring are inclined relative to a center line, wherein the angle of the inclined end faces at the ends of the open spring ring relative to the center line is between 20° and 60°.

8. The tensioning device according to claim 7, wherein the angle of the inclined end faces at the ends of the open spring ring relative to the center line is between 30° and 40°.

9. The tensioning device according to claim 1, wherein the tensioner housing has an engagement opening in the area of an adjustment groove to enable the adjustment device to be reset.

10. The tensioning device according to claim 9, wherein the engagement opening in the tensioner housing is formed as a bore.

11. The tensioning device according to claim 10, wherein the diameter of the bore in the tensioner housing corresponds to the diameter of supply bores of the hydraulic fluid to the pressure chamber of the tensioning device.

12. The tensioning device according to claim 10, wherein the bore passes through the tensioner housing.

13. The tensioning device according to claim 1, wherein the tensioning device is configured as a screw-in tensioner.

14. The tensioning device according to claim 13, wherein a thread profile on the tensioner housing extends over both sides of an engagement opening.

15. A chain drive comprising a drive sprocket, at least one output sprocket, a drive chain connecting the drive sprocket and the at least one output sprocket to one another, and a tensioning device according to claim 1, the tensioning device tensioning the drive chain, and wherein the chain drive includes a timing chain drive of an internal combustion engine.

16. The tensioning device according to claim 1, wherein the distance between the tensioning-side opening of the piston bore in the tensioner housing and the adjustment groove formed in the piston bore is at least 30% of the axial length of the tensioning piston.

17. The tensioning device according to claim 1, wherein the tensioning device includes a hydraulically actuated chain tensioner for a chain drive of an internal combustion engine.

* * * * *